June 19, 1962 J. B. JONES ET AL 3,039,333
APPARATUS FOR INTRODUCING HIGH LEVELS OF
VIBRATORY ENERGY TO A WORK AREA
Filed June 3, 1958 2 Sheets-Sheet 1
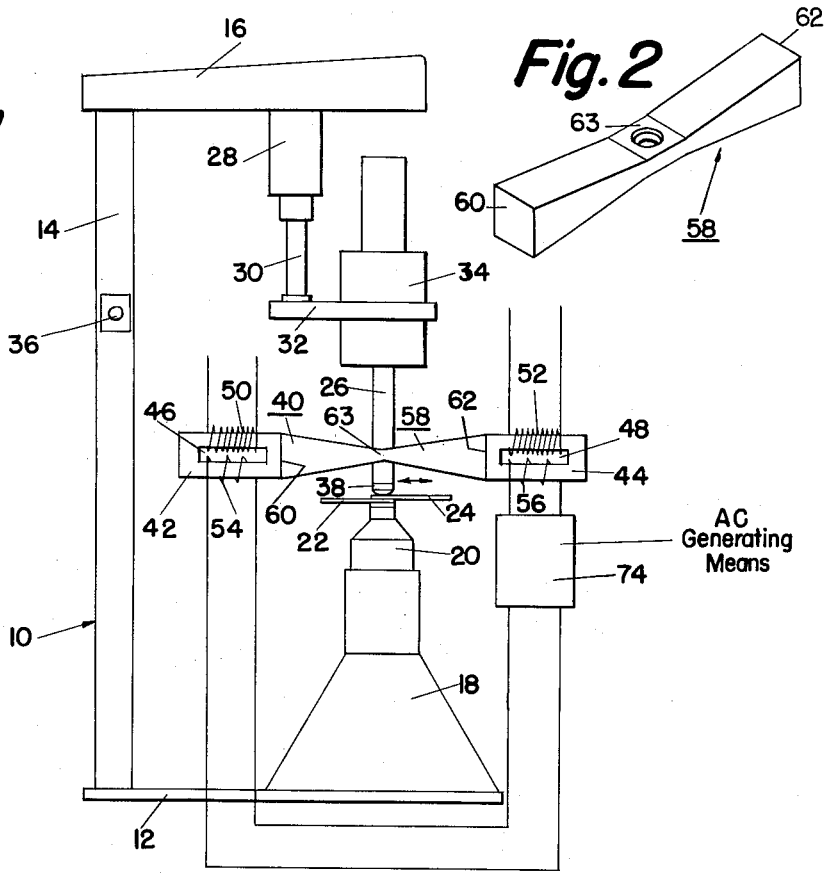
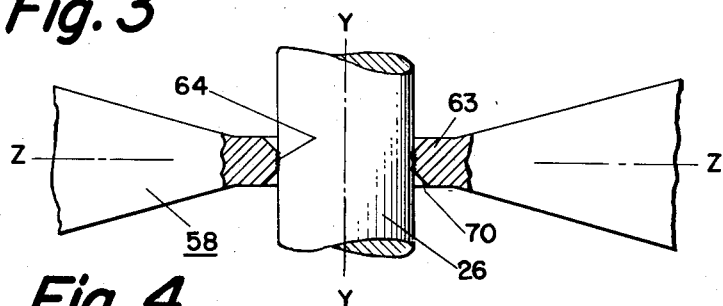
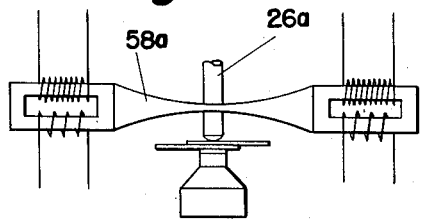
INVENTORS
JAMES BYRON JONES
ELMER E. WEISMANTEL
CARMINE F. DE PRISCO
BY Arthur H. Seidel
ATTORNEY

United States Patent Office 3,039,333
Patented June 19, 1962

3,039,333
APPARATUS FOR INTRODUCING HIGH LEVELS OF VIBRATORY ENERGY TO A WORK AREA
James Byron Jones, West Chester, Carmine F. De Prisco, Glen Mills, and Elmer E. Weismantel, Chester, Pa., assignors to Aeroprojects Incorporated, West Chester, Pa., a corporation of Pennsylvania
Filed June 3, 1958, Ser. No. 739,503
11 Claims. (Cl. 78—82)

The present invention relates to apparatus for introducing high levels of vibratory energy to a work area, and more particularly to means useful in the vibratory welding of metals and the like wherein it is desirable or necessary to introduce relatively high power levels of vibratory energy to workpieces.

In earlier-filed patent applications, namely patent application Serial No. 467,382 filed November 8, 1954, for "Method and Appparatus Employing Vibratory Energy for Bonding Materials," now abandoned; and its copending continuation-in-part patent applications Serial Nos. 579,780 filed April 23, 1956, for "Method and Apparatus Employing Vibratory Energy for Bonding Metals"; and 610,991 filed September 5, 1956, for "Method and Apparatus Employing Vibratory Energy for Bonding Metals," now Patent No. 2,985,954, issued May 30, 1961, in the name of James Byron Jones, William C. Elmore and Carmine F. De Prisco there is disclosed various apparatus embodiments for, and various methods of bonding metals together in which contacting surfaces of the metals to be bonded are held under sufficient force to hold them together in firm contact at the intended weld interface and while the metals are so-retained, elastic vibration [1] is applied to the weldment so as to produce either shear vibration or a combination of shear and compressive vibration at the interface being bonded.

We have found that relatively high power levels are required to effect the joining of relatively thick, heavier, and more dense metal workpieces. Moreover, we have found that only within limits can increasing the size of the transducer element and its associated coupler accomplish an increase in power delivery. Thus, the physical problems of delivering high power levels of vibratory energy to a diminutive work area are complex and, as set forth above, are not subject to ready solution by extrapolation. We have found that the energy delivered to the work area does not increase in direct proportion to the electrical energy delivered to a single magnetostrictive transducer stack. This is to say that we have found, for example, while it is possible and practical to deliver upwards of 1700 watts of power to a two- and one-quarter-inch square cross-section of 15 kilocycles per second nickel stack, the work done at the work area was not very much more than the work done with 1400 watts of power delivered to the stack, or, in other words, that 1400 watts of power delivered to such a stack does less work at the work area than 1400 watts of power delivered to the apparatus of the present invention. It is well known that the maximum power that can go into a stack is a function of the volume of the nickel; it is also well known that single nickel stacks cannot be increased indefinitely in cross-section at a fixed frequency; as a rule of thumb, the width of a single lamination of a simple single window nickel stack should not greatly exceed 35% of a wavelength in the nickel at the applied frequency. In addition, it has been found that a single transducer-coupler combination when attached at its coupler end to a reed presents an unsymmetrical array which may be unstable under some circumstances, whereas by means of the transducer-coupler combination of the present invention the array is rendered more rigid and directional.

This invention has an object the provision of apparatus for introducing higher levels of vibratory energy to a work area than can be obtained with a single simple transducer system.

This invention has as another object the provision of apparatus for introducing high power levels of shear vibration to a work area.

This invention has as another object the provision of novel welding apparatus.

This invention has as yet another object the provision of welding apparatus for vibratorily welding relatively thick metal members together.

Other objects will appear hereinafter.

For the purpose of illustrating the invention there is shown in the drawings forms which are presently preferred; it being understood, however, that this invention is not limited to the precise arrangements and instrumentalities shown.

Referring to the drawings wherein like reference characters refer to like parts:

FIGURE 1 is a side elevational view of one embodiment of a welder of the present invention.

FIGURE 2 is an isometric view of the coupler embodiment of the present invention.

FIGURE 3 is a fragmentary enlarged sectional view through the center portion of the coupler embodiment used in the welder of FIGURE 1.

FIGURE 4 is a fragmentary elevational view revealing another welder embodiment of the present invention.

Figure 5:
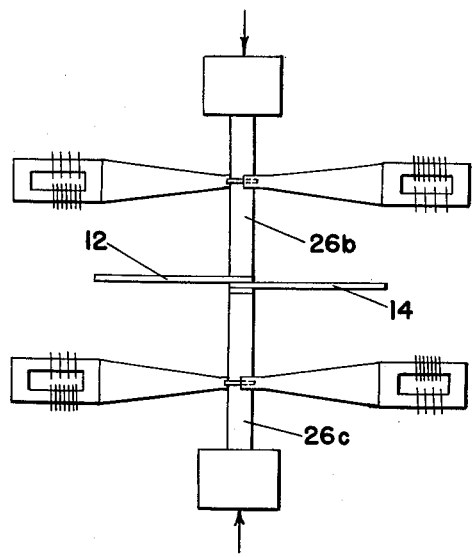
FIGURE 5 is an elevational view of another embodiment of the welder of the present invention.

The welder shown in FIGURE 1 is designated generally by the numeral 10 and comprises a base 12 which carries an upright 14 and an uppermost thrust anchor plate 16.

A support 18 is carried upon the base 12 and supports the reflector anvil 20 for the workpieces 22 and 24.

A reed 26, hereinafter referred to as sonotrode 26, which is rigidly clamped by mass 34, is spaced from and in axial end-to-end juxtaposition to the reflector anvil 20.

Means are provided for pressure-urging the sonotrode 26 towards the juxtaposed uppermost face of reflector anvil 20, and in the illustrated embodiment such means include the hydraulic cylinder 28 which is anchored to the lowermost surface of the anchor plate 16, the piston 30 for such cylinder 28, the flange 32 which is joined to the piston 30, and the clamping mass 34 for the sonotrode 26 which is retained within flange 32.

Control means 36 may be provided for raising or lowering the sonotrode 26 as by the extension or retraction of the piston 30.

The sonotrode 26 is vibrated laterally, namely its tip 38 assumes the path generally indicated by the double-headed arrow in FIGURE 1, due to the action of the double transducer and double coupler designated generally by the numeral 40.

It is to be understood that a wide variety of useful transducers are known to those skilled in this art. However, for operation at high power levels in the frequency range of paramount significance, magnetostrictive transducers are presently preferred, although other types of transducers can be used. Such magnetostrictive transducers consist of a magnetostrictive metal, such as nickel, the alloy 2–V Permendur (an iron-cobalt alloy), a nickel-iron alloy, or Alfenol (an aluminum-iron alloy), properly dimensioned to insure axial resonance with the frequency of the alternating current applied thereto so as to cause it to decrease or increase in length according to its coefficient of magnetostriction. Magnestostrictive transducers are presently preferred for operation at frequencies

---

[1] By "elastic" as used herein is meant that the vibration is applied to the weldment by means of an elastic member, such as a metal or ceramic rod.

of up to about 75,000 cycles per second, although they can be used at other frequencies.

While magnetostrictive transducers are presently preferred in the apparatus of the present invention, alternatively other forms of transducers may be used. A wide variety of transducers are presently available, many of which have good physical properties and exhibit appreciable changes in physical dimensions under the influence of electric current or an electric potential. Examples of suitable transducers include electrostrictive materials such as barium titanate or lead zirconate, or piezoelectric materials such as quartz crystals. Preferably, the last-mentioned materials are presently preferably used at high frequency operations, as at frequencies above about 75,000 cycles per second, although they can be used at other frequencies.

Other transducers which may be used in the apparatus of the present invention include ferroelectric materials or an electromagnetic device, such as that which actuates a radio loudspeaker.

In the illustrated embodiment wherein magnetostrictive transducers 42 and 44 are utilized, each of said transducers comprises a laminated core of nickel or other magnetostrictive metallic material, the transducers 42 and 44 having respective rectangularly shaped window openings 46 and 48 within their center portion. Each of the transducers 42 and 44 is provided with a polarizing coil, namely polarizing coil 50 for transducer 42 and polarizing coil 52 for transducer 44. Each of the transducers 42 and 44 is also provided with an excitation coil, namely transducer 42 is provided with excitation coil 54 and transducer 44 is provided with excitation coil 56. It will be understood by one skilled in the art that the frequency of the alternating current applied to the respective excitation coils 54 and 56 should be equal to the resonant mechanical frequency of the magnetostrictive transducers 42 and 44 in order that good efficiency will be exhibited by the system. Furthermore, it is necessary that the polarizing coils 50 and 52 be energized at a suitable level with D.-C. current.

The transducers 42 and 44 are joined together by means of the double coupler 58. The double coupler 58 is a generally bow-tie-shaped monometal rod as seen particularly in FIGURE 2 whose end portions 60 and 62 are respectively metallurgically joined, as by brazing or the like, to the transducers 42 and 44. The end portions 60 and 62 are relatively thick, and the double coupler 58 tapers inwardly, with its centermost portion 63 comprising the thinnest portion of the double coupler 58. The double coupler 58 should be dimensioned so as to resonate at the operating frequency of the transducers 42 and 44. Preferably, to avoid design difficulties, both the transducers 42 and 44 should operate at the identical frequency, and preferably should be as closely identical in construction as is feasible.

We have found that the construction of the securement means between the double coupler 58 and the sonotrode 26 plays a most important role in the satisfactory performance of the apparatus of the present invention; in particular, the cylindrical area of the reed that is in metallurgical contact with the embracing cylindrical land of the double-wedge must not be too long. Thus, we have found that if unsatisfactory securement means are utilized between the sonotrode 26 and the double coupler 58 loosening will result in use due to the dislodgement forces arising from the vibratory energy introduced into the double coupler 58 by the transducer-coupling 42 and 44. As disengagement of the double coupler 58 from the sonotrode 26 will result in a marked deficiency in the operating characteristics or a total failure of the apparatus of the present invention, the importance of securing a firm and durable bond, such as an extremely perfect mechanical joint or preferably a metallurgical bond, between the double coupler 58 and sonotrode 26 is critical. Not only is it necessary to secure a firm bond between the sonotrode 26 and the double coupler 58, but moreover the assembly of the sonotrode 26 in respect to the double coupler 58 should be effected with precision. We have found that unless a precise assembly is effected between the double coupler 58 and the sonotrode 26, a marked tendency for failure at the joint between the sonotrode 26 and the double coupler 58 will result in use, or, if land 64 is too long, the reed-coupler system becomes too stiff and inhibits welding.

We have found that the joint construction shown in FIGURE 3 constitutes a satisfactory and relatively simple means for securing the sonotrode 26 to the double coupler 58. Alternatively, and particularly where maximum reliability and maximum length of operational life is desired, the flange and socket joint described in the United States patent application Serial No. 739,504 filed on even date herewith may be substituted. The disclosure of such application is to be deemed incorporated herein.

In the construction shown in FIGURE 3, the center portion 63 of the double coupler 58 comprises a plurality of lands including a central cylindrical land 64 which embraces the sonotrode 26 and a pair of tapered adjacent countersinks 70. The cylindrical land 64 of the double coupler 58 must fit the sonotrode 26 closely, preferably with the optimum gap for brazing being about 0.001-inch to 0.002-inch, and the axis ZZ of the double coupler system should be precisely at right angles to the axis YY of the sonotrode 26. Brazing of this assembly usually requires that excessive braze metal be removed from most of the countersinks 70, leaving the cylindrical land 64 cleanly brazed to the outer wall of the sonotrode 26.

As illustrative of the dimensioning of a double coupler 58, the following precise dimensions for a suitable double coupler will be given:

For a double coupler intended for use intermediate a pair of two-inch by two-and-one-quarter-inch nickel magnetostrictive transducers dimensioned for operation at fifteen kilocycles for use with a reed having a diameter of approximately one inch, a length intermediate the center and one of the transducers of 6.69 inches was found effective for a steel double coupler. The thickness at the end (the subject description will be confined for one side of the double coupler, the double coupler being completely symmetrical) was two-and-one-quarter inches while the thickness at the center was 0.375-inch with the cylindrical land 64 which is brazed to the cylindrical surface of the sonotrode 26 having a cylindrical height of 0.125-inch. The 0.375-inch thickness was maintained for three-quarters of an inch on either side of the exact center, with the coupler tapering gradually along its length from such 0.375-inch dimension to its full thickness of two-and-one-quarter inches at the end. The width of the double coupler throughout its length was maintained at two inches.

Excitation energy for the excitation coils 54 and 56 is provided from generating means 74 which furnishes alternating current to the excitation coils 54 and 56 of the transducers 42 and 44. Positioning or phasing of the double transducer and double coupler is such as to deliver maximum energy at the work area; thus, excitation energy may be furnished to excitation coil 54 which is 180 degrees out of phase with the alternating current supplied to coil 56, so that the double transducer and double coupler operate in the manner of a two-man saw, assuring compliance of operation of the reed and making for a more symmetrical system than the single-transducer-coupler and reed array described in United States patent application Serial No. 579,780 cited above. The construction of generating means 74 in a form suitable for furnishing suitably phased alternating current to the excitation coils 54 and 56 forms no part of the present invention, and such construction will be apparent to those having skill in the construction of driving systems for magnetostrictive transducers.

Welding with the apparatus of the present invention is effected under a clamping force sufficient to hold the metal work-pieces 22 and 24 being welded in firm contact at the intended weld interface.

The clamping force may be varied over a wide range by adjusting the fluid pressure in hydraulic cylinder 28. In preferred embodiments, the maximum clamping force need not produce an external deformation [2] of more than about ten percent in weldments initially effected at room or ambient temperatures. In many cases the extent of deformation is appreciably below ten percent and in many instances may be virtually absent altogether. The minimal clamping force to be used in the process of our invention constitutes a force sufficient to maintain the metals being welded in regulated alignment and firm contact, e.g. contacting each other so that the weld may be effected by the application of vibratory energy.

The range of operative clamping pressures which may be employed in the process of the present invention may be readily ascertained by the user of the process. In all cases, the clamping force must be sufficient to effect coupling between the metals being welded and the source of vibratory energy, so that such vibratory energy may be transmitted to the metals.

A wide range of vibratory welding frequencies may be utilized with the apparatus of the present invention, with the optimum operating frequency lying between about 5,000 and 75,000 cycles per second. This optimum range of operating frequencies may be achieved by transducer elements of known design which are capable of generating elastic vibratory energy of high intensity.

Welding with the apparatus of the present invention may be and in many instances is initiated at room temperatures or ambient temperatures without the application of heat.[3] If desired, welding may also be initiated at elevated temperatures below the fusion temperature (melting point or solidus temperature of any of the pieces being bonded).[4] Thus, heating the metals to be welded prior to, and/or during welding to a temperature below their fusion temperature may, in some cases, facilitate the ease of welding and lower the power requirements and/or time requisite to achieve welding. Welding in accordance with the apparatus of the present invention may be utilized to form both spot and overlapping-spot type welds.

Welding with the apparatus of the present invention may be applied to a wide variety of metals, examples of which include: aluminum to aluminum; aluminum alloy to aluminum alloy; copper to copper; copper to aluminum; brass to brass; magnesium alloy to magnesium alloy; nickel to nickel; stainless steel to stainless steel; silver-titanium alloy to silver-titanium alloy; gold-platinum alloy to stainless steel; platinum to copper; platinum to stainless steel; gold-platinum alloy to nickel; titanium alloy to titanium alloy; molybdenum to molybdenum; aluminum to nickel; stainless steel to copper alloy; nickel to copper alloy; nickel alloy to nickel alloy; sintered aluminum powder to sintered aluminum powder.[5]

Spot-type welding with the apparatus of the present invention may be accomplished within a relatively wide time range, such as a time range of between about 0.001 second to up to about 6.0 seconds or somewhat more, with welding under most normal conditions being effected during a time interval of from several hundredths of a second to two seconds, most generally about 1.5 seconds.

The apparatus of the present invention may be modified, if desired, so as to permit welding in either highly evacuated atmospheres, or in selected atmospheres, such as atmospheres comprising an inert gas. However, the welding of most metals may be effected in the ambient atmosphere.

Welding with the apparatus of the present invention may be effected with metals, such as aluminum, without the extensive precleaning required to effect satisfactory welding by other methods. However, a degree of precleaning and surface treatment may prove advantageous, and it is desirable prior to effecting welding to remove surface contaminants, such as mill scale, hydrocarbon or other lubricants, and the like.

The vibratory movement of the sonotrode 26 in flexture in the indicated direction effects welding between the workpieces 22 and 24. We have found that use of the double transducer and double coupler 40 with appropriate power sources enables the introduction of exceptionally high energy level vibratory energy to the workpieces 22 and 24. For example, whereas with a single transducer-coupler attached to the reed (as shown in copending United States patent application Serial No. 579,780 above cited) it has been possible to meet the requisite military specification shown in MIL–W–6860 for joining 0.040-inch Alclad 2024–T3 aluminum alloy, with the double transducer-coupler system of the present invention and an appropriate power supply it has been possible to meet the requisite military specification for 0.072-inch Alclad 2024–T3 aluminum alloy and marginally also for the 0.080-inch gage of that material.

While the description of the apparatus is directed to its use as a welder, it is to be understood that the apparatus of the present invention is not limited to applications in the welding of metals, but that the subject apparatus with appropriate engineering adaptations may be utilized for the delivery of vibratory energy at high energy levels for other end uses.

The apparatus embodiment of FIGURE 4 generally resembles that of FIGURES 1 and 2 except that in place of the tapered double coupler 58 a curved double coupler 58a whose taper is an exponential function of its length is substituted. Each of the parts of integral curved double coupler 58a on either side of its center may be curved to conform to the relation for a curved "horn" set forth at page 163 of Piezoelectric Crystals and Ultrasonics, by Warren P. Mason, published in 1950 by Van Nostrand Company. The curvature of the double coupler in the manner indicated may provide for modestly improving the efficiency of the system. In all other respects, the embodiment shown in FIGURE 4 resembles that of the embodiment of FIGURES 1 and 2.

The present invention also contemplates attaching a plurality of double couplers of the type described above at spaced distances along the axis of a reed.

The present invention also contemplates the embodiment of FIGURE 5, which is also capable of operating at high power levels. In the vibratory welding transducer-coupler system of FIGURE 1, there is substituted for the anvil 20 a second sonotrode with its associated couplers, transducers, and mass. Thus, in the embodiment shown in FIGURE 5 the metal workpieces 12 and 14 are welded together intermediate the sonotrodes 26b and 26c, with the clamping force being applied between such sonotrodes. The sonotrodes 26b and 26c operate at the same frequency but are 180 degrees out of phase with each other; that is, the associated diagonally-opposed transducers are in phase with each other, so that the effect is comparable to having two two-man saws, each such saw operating out of phase with the other, one double-coupler going in one direction at the same time

---

[2] By deformation is meant the change in dimensions of the weldment adjacent the weld zone divided by the aggregate thickness of the weldment members prior to welding, result multiplied by 100 to obtain percentage.

[3] The weldment may be warm to the touch after the weld due to the application of the elastic vibratory energy.

[4] The temperatures to which the foregoing statements refer are those which can be measured by burying diminutive thermocouples in the weld zone prior to welding, as well as the temperatures which can be estimated or approximated from a metallographic examination of a cross-section of a vibratory weld in the ordinary magnification range of up to about 500 diameters.

[5] A mixture consisting of elemental aluminum and aluminum oxide.

that the other double-coupler is going in the opposite direction.

The general construction of the junctions between couplers and sonotrodes follows the construction shown in FIGURE 3 or the alternatives heretofore suggested for that junction and need not be described. The construction of the associated transducers-couplers also follows the construction for the transducers-couplers previously described, except that all the couplers have flat bases for reasons of improved work clearance conditions. The construction of the couplers to have flat bases is within the understanding of anyone skilled in the art of constructing couplers having a larger area at one end than at the other end, a small adjustment in calculating areas being sufficient to achieve the effect desired, i.e., a flat base.

The present invention may be embodied in other specific forms without departing from the spirit or essential attributes thereof and, accordingly, reference should be made to the appended claims, rather than to the foregoing specification as indicating the scope of the invention.

We claim:

1. Vibratory apparatus comprising a reed, an elongated vibration-transmitting coupler, said reed being angularly positioned in respect to said coupler and fixedly secured to said coupler intermediate the ends of both said coupler and said reed, vibrating means for generating vibratory energy secured to each of the ends of said coupler, and means for vibrating said vibrating means at one end of said coupler out-of-phase with said vibrating means at the other end of said coupler.

2. Vibratory apparatus comprising a reed, an elongated vibration-transmitting coupler, said vibration-transmitting coupler comprising a relatively thin center portion and relatively thick end portions, with the end portions on either side of the center portion being generally symmetrical, said reed being generally perpendicularly positioned in respect to said coupler and fixedly secured to and projecting through an opening in the relatively thin center portion of said coupler, vibrating means for generating vibratory energy secured to each of the ends of said coupler, and means for vibrating said vibrating means at one end of said coupler out-of-phase with said vibrating means at the other end of said coupler.

3. Vibratory apparatus comprising a reed, an elongated vibration-transmitting coupler, said reed being angularly positioned in respect to said coupler and fixedly secured to said coupler intermediate the ends of both said coupler and said reed, separate magnetostrictive transducers secured to each of the ends of said coupler, each of said magnetostrictive transducers being dimensioned to generate vibratory energy of the same frequency, each of said magnetostrictive transducers including polarizing means and excitation means, and means for furnishing alternating current to the excitation means of said magnetostrictive transducers at the ends of said coupler, said means furnishing alternating current to the excitation means of the magnetostrictive transducer at one end of said coupler which is out-of-phase with the alternating current supplied to the excitation means of the magnetostrictive transducer at the other end of said coupler.

4. Vibratory apparatus comprising a reed rigidly supported by a mass, said mass urging said reed downwardly, an elongated vibration-transmitting coupler, said reed piercing a center portion of said coupler and being rigidly secured thereto, the principal axis of said reed being generally perpendicular to the principal axis of said coupler, said coupler being bow-tie-shaped and having a relatively thin center portion as compared with relatively thick end portions, and vibrating means for generating vibratory energy rigidly secured to each of the ends of said coupler, said vibrating means comprising magnetostrictive transducers having polarizing means and excitation means and in which the means for vibrating said vibrating means comprises means for furnishing alternating current to the excitation means of the magnetostrictive transducer at one end of said coupler which is out-of-phase with the alternating current supplied to the excitation means of the magnetostrictive transducer at the other end of said coupler.

5. A welding device for welding together the contacting surfaces of a plurality of metal members, said device comprising a reed, an elongated vibration-transmitting coupler, said reed being angularly positioned in respect to said coupler and fixedly secured to said coupler intermediate the ends of both said coupler and said reed, vibrating means for generating vibratory energy secured to each of the ends of said coupler, means for vibrating said vibrating means at one end of said coupler out-of-phase with said vibrating means at the other end of said coupler, support means for supporting the metal members to be welded spaced from one end of said reed, and means for urging said reed against the metal members to be welded while the metal members are interposed between said support means and said reed with sufficient force to hold the contacting surfaces of the metal members together.

6. A welding device for welding together the contacting surfaces of a plurality of metal members, said device comprising a reed, an elongated vibration-transmitting coupler, said coupler having a relatively thin center portion and relatively thick end portions, said reed being angularly positioned in respect to said coupler and projecting through and fixedly secured to the relatively thin center portion of said coupler, vibrating means for generating vibratory energy secured to each of the ends of said coupler, means for vibrating said vibrating means at one end of said coupler out-of-phase with said vibrating means at the other end of said coupler, support means for supporting the metal members to be welded spaced from one end of said read, and means for urging said reed against the metal members to be welded while the metal members are interposed between said support means and said reed with sufficient force to hold the contacting surfaces of the metal members together.

7. A welding device for welding together the contacting surfaces of a plurality of metal members, said device including a reed, an elongated vibration-transmitting coupler, said reed being angularly positioned in respect to said coupler and fixedly secured to said coupler intermediate the ends of both said coupler and said reed, separate magnetostrictive transducers secured to each of the ends of said coupler, each of said magnetostrictive transducers being dimensioned to generate vibratory energy of the same frequency, each of said magnetostrictive transducers including polarizing means and excitation means, means for furnishing alternating electric current to the excitation means of said magnetostrictive transducers at the ends of said coupler, said means furnishing alternating current to the excitation means of the magnetostrictive transducer at one end of said coupler which is out-of-phase with the alternating electric current furnished to the excitation means of the magnetostrictive transducer at the other end of said coupler, support means for supporting the metal members to be welded spaced from one end of said reed, and means for urging said reed against the metal members to be welded while the metal members are interposed between said support means and said reed with sufficient force to hold the contacting surfaces of the metal members together.

8. Vibratory apparatus comprising a reed, an elongated vibration-transmitting coupler, said reed being angularly positioned in respect to said coupler and fixedly secured to said coupler intermediate the ends of both said coupler and said reed, and a magnetostrictive transducer secured to each of the ends of said coupler, with each of said magnetostrictive transducers being dimensioned to generate vibratory energy of the same frequency and means for operating said magnetostrictive transducers in one hundred eighty degrees out-of-phase relation with respect to each other.

9. Vibratory apparatus comprising an elongated vibration-transmitting coupler, a passageway extending through the thickness of said coupler intermediate its ends, said passageway including a relatively narrow passageway extending for a distance less than the thickness of said coupler and a contiguous relatively wide passageway extending for the remaining portion of the thickness of the coupler, and vibrating means for generating vibratory energy secured to each of the ends of said coupler and means for vibrating the vibrating means at one end of the coupler out-of-phase with the vibrating means at the other end of said coupler.

10. Vibratory apparatus in accordance with claim 9 in which the coupler comprises a relatively thin center portion and relatively thick end portions and in which the passageway is disposed in the relatively thin center portion.

11. A vibratory apparatus in accordance with claim 8 wherein said reed is a solid reed.

References Cited in the file of this patent

UNITED STATES PATENTS

| | | |
|---|---|---|
| 2,725,219 | Firth | Nov. 29, 1955 |
| 2,891,180 | Elmore | June 16, 1959 |
| 2,946,119 | Jones | July 26, 1960 |

FOREIGN PATENTS

| | | |
|---|---|---|
| 1,087,439 | France | Aug. 25, 1954 |
| 1,087,440 | France | Aug. 25, 1954 |

OTHER REFERENCES

Ultrasonic Welding, by J. B. Jones and J. J. Powers, Jr., Aug. 16, 1959, pp. 761–766.